United States Patent [19]
Turnbull

[11] Patent Number: 5,839,755
[45] Date of Patent: Nov. 24, 1998

[54] METHOD AND APPARATUS FOR RESTRAINING A VEHICLE OCCUPANT

[75] Inventor: Roy C. Turnbull, Troy, Mich.

[73] Assignee: TRW Vehicle Safety Systems Inc., Lyndhurst, Ohio

[21] Appl. No.: 205,534

[22] Filed: Mar. 3, 1994

[51] Int. Cl.⁶ .................................................. B60R 21/30
[52] U.S. Cl. ...................................... 280/739; 280/743.1
[58] Field of Search ............................... 280/728 R, 729, 280/738, 739, 743 R; 383/103; 137/859

[56] References Cited

U.S. PATENT DOCUMENTS

| | | | |
|---|---|---|---|
| Re. 34,104 | 10/1992 | Takada | 280/728 R |
| 3,451,693 | 6/1969 | Carey . | |
| 3,733,091 | 5/1973 | Fleck et al. . | |
| 3,762,741 | 10/1973 | Fleck et al. . | |
| 3,879,057 | 4/1975 | Kawashima et al. . | |
| 4,181,325 | 1/1980 | Barnett . | |
| 4,262,931 | 4/1981 | Strasser et al. | 280/739 |
| 4,360,223 | 11/1982 | Kirchoff | 280/743 R |
| 4,715,494 | 12/1987 | Heitzenröder | 383/103 |
| 5,007,662 | 4/1991 | Abramczyk et al. | 280/739 |
| 5,186,468 | 2/1993 | Takano . | |
| 5,219,179 | 6/1993 | Eyrainer et al. . | |
| 5,246,250 | 9/1993 | Wolanin et al. | 280/739 |
| 5,310,215 | 5/1994 | Wallner | 280/739 |

FOREIGN PATENT DOCUMENTS

| | | | |
|---|---|---|---|
| 2093757 | 1/1972 | France . | |
| 2221918 | 11/1972 | Germany . | |
| 2944319 | 5/1981 | Germany | 280/739 |
| 8800530 | 4/1988 | Germany . | |
| 4-2543 | 1/1992 | Japan | 280/739 |
| 5-162608 | 6/1993 | Japan | 280/739 |

*Primary Examiner*—J. J. Swann
*Assistant Examiner*—Gary Savitt
*Attorney, Agent, or Firm*—Tarolli, Sundheim, Covell, Tummino & Szabo

[57] ABSTRACT

An inflatable air bag (10) inflates to restrain a vehicle occupant (13) during a vehicle collision. The air bag has an opening (16) for venting inflation fluid from the interior (14) of the air bag. A panel (20) lies on an outer surface (40) of the air bag and is fixedly secured to the outer surface of the air bag. The panel comprises a single continuous piece of elastic material overlying at least a part of the opening. The elastic material is stretchable from an unstretched condition in which a central portion (36) of the elastic material blocks at least a part of the opening to a stretched condition in which the central portion of the elastic material is stretched and moved away from the opening to unblock the opening. When the opening is unblocked, inflation fluid is vented through the opening.

8 Claims, 4 Drawing Sheets

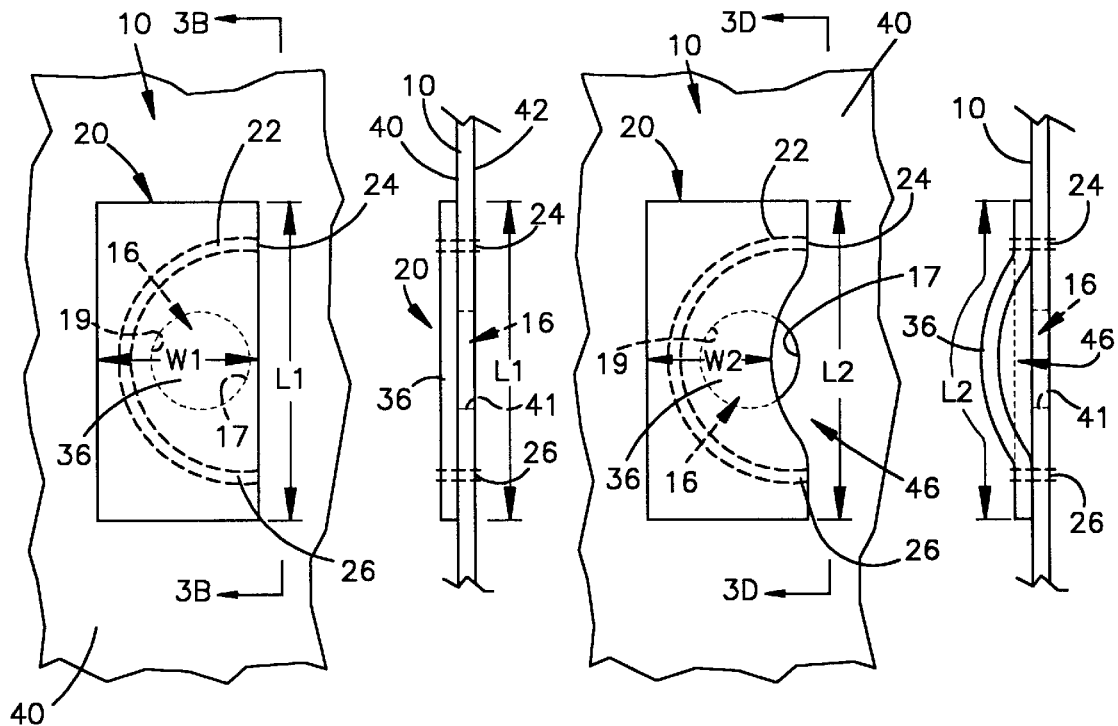

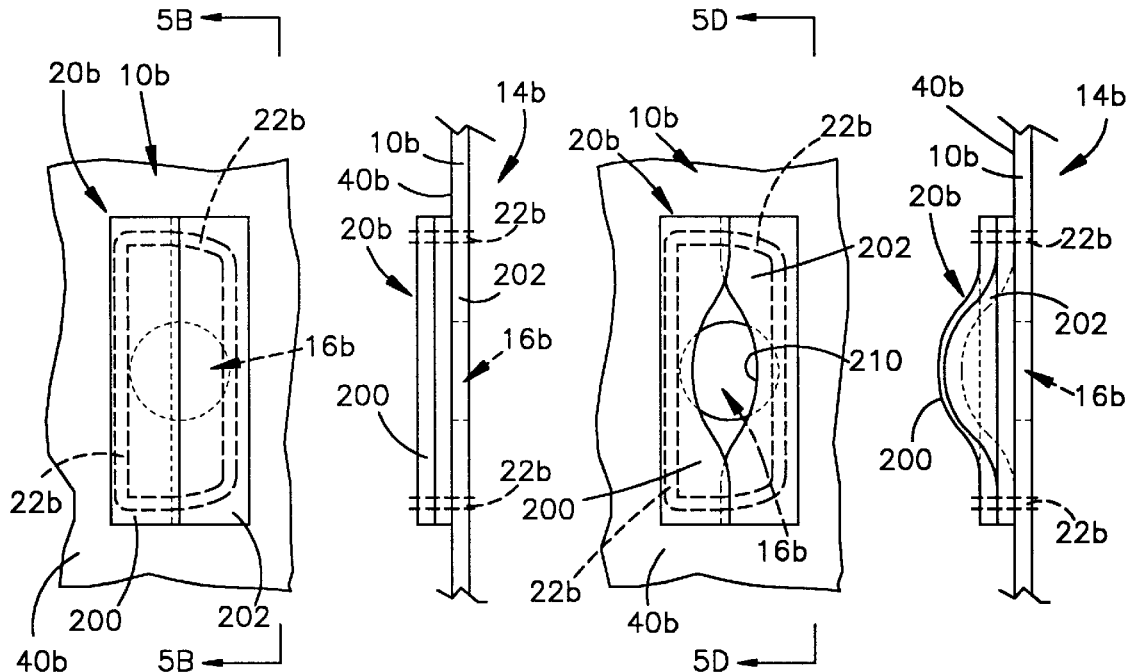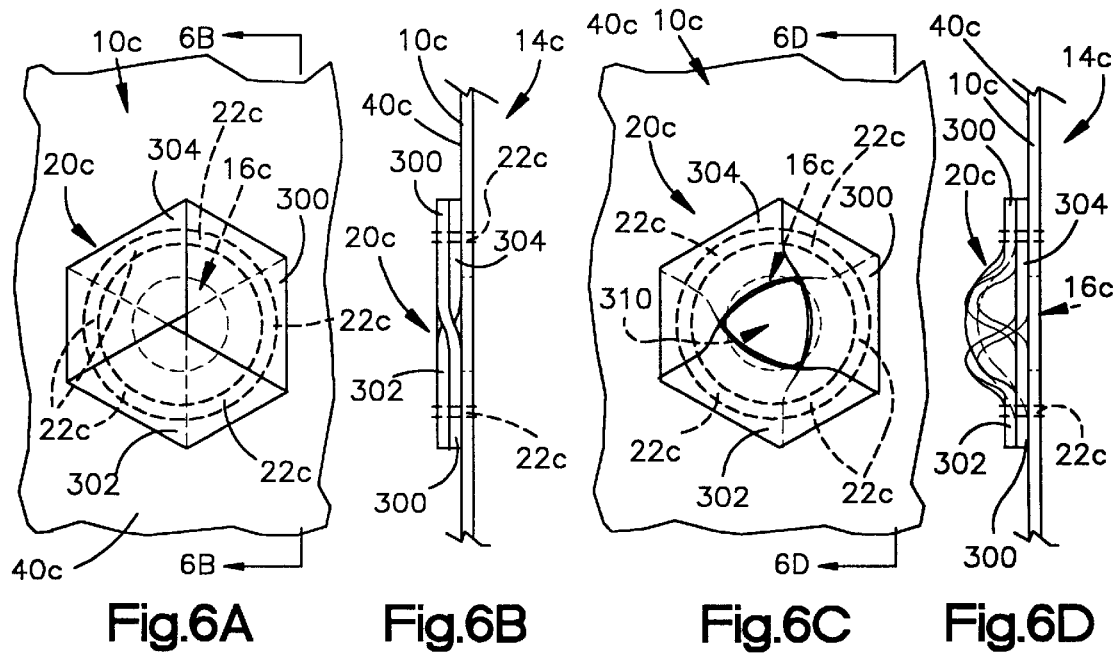

METHOD AND APPARATUS FOR RESTRAINING A VEHICLE OCCUPANT

BACKGROUND OF THE INVENTION

The present invention relates to an inflatable vehicle occupant restraint system, and is particularly directed to an inflatable air bag for use in a vehicle occupant restraint system.

BACKGROUND ART

A vehicle occupant restraint system having an inflatable air bag is known. Typically, an inflatable air bag is inflated by inflation fluid directed in to the air bag in response to the vehicle experiencing sudden deceleration above a predetermined threshold indicative of a collision. The inflated air bag absorbs energy resulting from the movement of an occupant against the air bag. The energy absorbed by the air bag is dissipated to minimize rebounding o f the occupant from the air bag.

One way to dissipate the energy absorbed by the air bag is to vent the inflation fluid in the air bag. It is known to vent the inflation fluid in the air bag through a vent opening. The vent opening may be covered with a patch, or the like, which moves to open the vent opening when a predetermined pressure is reached inside the air bag. Thus, inflation fluid inside the air bag passes through the vent opening when the pressure inside the air bag reaches the predetermined pressure.

SUMMARY OF THE INVENTION

In accordance with the present invention, an inflatable air bag inflates to restrain a vehicle occupant during a vehicle collision. The air bag comprises air bag material having an outer surface and an inner surface. The inner surface defines a chamber into which inflation fluid is directed to inflate the air bag. The air bag material includes a surface extending between the outer and inner surfaces which defines an opening for venting inflation fluid from the chamber. A panel lies on the outer surface of the air bag material. The panel comprises a first single continuous piece of elastic material having a length and a width and overlying at least a part of the opening. Means is provided for fixedly securing the elastic material of the panel to the outer surface of the air bag material. The means for fixedly securing the panel to the outer surface of the air bag material may include, for example, stitches.

The elastic material is stretchable in response to the inflation fluid pressure in the chamber. The elastic material is stretchable from an unstretched first length in which a central portion of the elastic material blocks at least a part of the opening to a stretched second length in which the central portion of the elastic material stretches and moves away from the opening to unblock the opening and thereby allows inflation fluid to be vented through the opening. The stretched second length is greater than the unstretched first length.

In a first embodiment of the present invention, the stitches extend around only a portion of the perimeter of the opening in the air bag material. In a second embodiment of the present invention, stitches are located only at opposite ends of the elastic material. In a third embodiment of the present invention, a second single continuous piece of elastic material has at least a portion which overlaps with a portion of the first single continuous piece of elastic material. Still further in a fourth embodiment of the present invention, a third single continuous piece of elastic material has at least a portion which overlaps with a portion of the first single continuous piece of elastic material and another portion which overlaps with a portion of the second single continuous piece of elastic material. In a fifth embodiment of the present invention, part of the central portion of the elastic material is layered upon itself and stitched together.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3A is a view taken approximately along line 3A—3A of FIG. 2;

FIG. 3B is a view taken approximately along line 3B—3B of FIG. 3A;

FIG. 3C is a view similar to FIG. 3A, but showing parts in a different position;

FIG. 3D is a view taken approximately along line 3D—3D of FIG. 3C;

FIGS. 4A–4D are views similar to FIGS. 3A–3D and showing a second embodiment of the present invention;

FIGS. 5A–5D are views similar to FIGS. 3A–3D and showing a third embodiment of the present invention;

FIGS. 6A–6D are views similar to FIGS. 5A–5D and showing a fourth embodiment of the present invention.

DESCRIPTION OF PREFERRED EMBODIMENTS

The present invention is directed to an inflatable air bag for restraining a vehicle occupant when the vehicle experiences a collision requiring air bag deployment. The specific construction of the air bag is not a part of the present invention and may vary.

Figure 1:
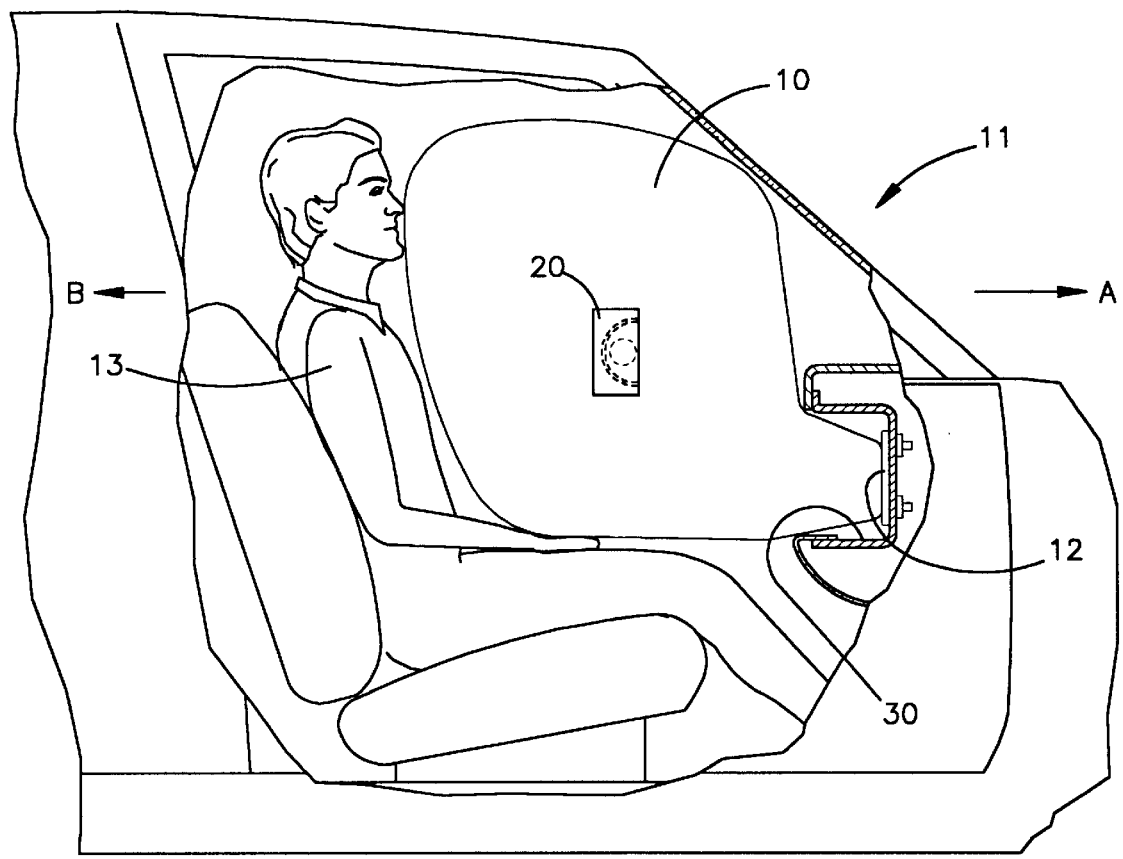
FIG. 1 is a schematic view of a vehicle occupant restraint system including an inflatable air bag constructed in accordance with the present invention.

Referring to FIG. 1, an inflatable air bag 10 (shown in FIG. 1 in an inflated condition) is incorporated in a vehicle occupant restraint system 11 for protecting an occupant 13. The vehicle has a forward direction of travel indicated by an arrow A and a rearward direction of travel indicated by an arrow B. Before inflation of the air bag 10, the air bag 10 is typically folded and stored in an air bag storage compartment 30 located in the instrument panel of the vehicle. The folded and stored air bag is in a condition ready for deployment upon occurrence of a vehicle collision requiring air bag deployment. It is contemplated that the air bag 10 may be folded and stored in an air bag storage compartment at a different location, such as in the vehicle door or in the steering wheel of the vehicle.

The air bag 10 has an opening 12 (best shown in FIG. 2) through which inflation fluid flows into the interior 14 of the air bag 10 to inflate the air bag 10. The interior 14 of the air bag 10 is defined at least in part by an inner surface of the air bag 10. An actuatable inflator (not shown), when actuated, provides the inflation fluid to inflate the air bag 10.

Although the opening 12 is shown as rectangularly-shaped, the opening 12 may be of another shape.

Figure 2:
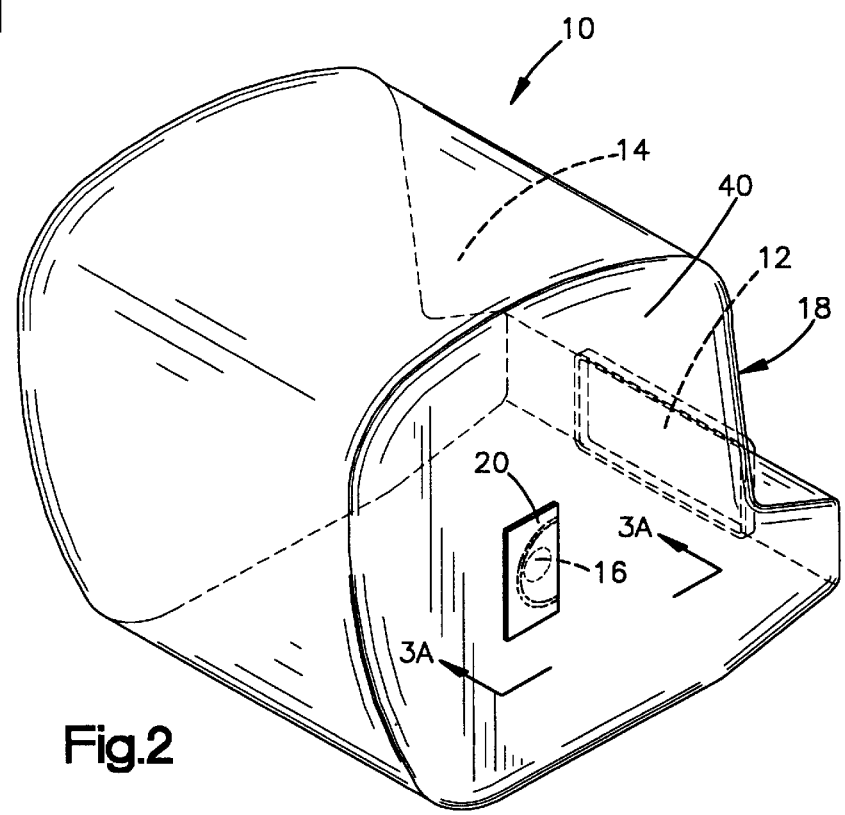
FIG. 2 is a perspective view of the air bag shown in FIG. 1.

Referring to FIGS. 2, 3A and 3B, the air bag 10 has an outer surface 40, an inner surface 42, and a surface 41 extending between the outer and inner surfaces 40, 42. The surface 41 defines a circular vent opening 16 located on one side 18 of the air bag 10. Although only the one vent opening 16 is shown, there could be a number of other vent openings located on the same side 18 of the air bag 10. Also, some vent openings may be located on the opposite side of the air bag 10. The vent opening 16 (FIGS. 3A and 3B) has a front edge portion 17 and a rear edge portion 19 opposite the front edge portion 17 and located closer to the occupant 13 than the front edge portion 17.

A panel 20 lies on the outer surface 40 of the air bag 10. The panel 20 comprises a single continuous piece of elastic material. The single continuous piece of elastic material may be made of various materials. Preferably, the elastic material is neoprene coated 420 or 840 denier nylon fabric.

A central portion 36 of the single continuous piece of elastic material of the panel 20 overlies at least a part of the vent opening 16. As illustrated in FIG. 3A, the central portion 36 of the elastic material of the panel 20 overlies the entire vent opening 16. The central portion 36 of the elastic material of the panel 20 is located between opposite lengthwise ends of the elastic material. As shown in FIGS. 3A and 3B, a middle part of the panel 20 (as viewed in FIG. 3A) has a width W1, and a rightmost edge of the panel 20 (also as viewed in FIG. 3A) has a length L1.

The elastic material of the panel 20 is fixedly secured to the outer surface 40 of the air bag 10 with stitches 22 made of a suitable thread. The stitches 22 surround only a portion of the perimeter of the vent opening 16 in the air bag 10. More specifically, the stitches 22 extend in a generally U-shape around the vent opening 16. The stitches 22 have opposite ends 24, 26 (FIG. 3A) located forwardly of the front edge portion 17 of the vent opening 16. The stitches 22 begin at the end 24 and extend in U-shape around the rear edge portion 19 of the vent opening 16. The stitches 22 then terminate at the end 26.

When a vehicle collision requiring air bag deployment occurs, inflation fluid is directed through the opening 12 into the interior 14 of the air bag 10 to inflate the air bag 10 as shown in FIG. 1. The occupant 13 moves forward against the air bag. The air bag 10 absorbs the energy resulting from movement of the occupant 13 against the air bag 10. As the air bag 10 absorbs the energy resulting from movement of the occupant 13 against the air bag 10, the pressure in the interior 14 of the air bag 10 increases.

When the pressure in the interior 14 of the air bag 10 reaches a predetermined pressure, the panel 20 starts to stretch from a closed position shown in FIGS. 3A and 3B to an open position shown in FIGS. 3C and 3D due to the increased pressure in the interior 14 of the air bag 10. As the panel 20 stretches from the closed position to an open position, the rightmost edge of the panel 20 (as viewed in FIGS. 3A and 3C) stretches from the unstretched length L1 shown in FIGS. 3A and 3B to a stretched length L2 shown in FIGS. 3C and 3D. The middle part of the panel 20 (also as viewed in FIGS. 3A and 3C) has a stretched width W2 when in a stretched condition such as shown in FIG. 3C. A stretched width W2 shown in FIG. 3C is substantially the same as the unstretched width W1 shown in FIG. 3A.

More specifically, as the elastic material of the panel 20 stretches from the unstretched condition shown in FIGS. 3A and 3B to a stretched condition shown in FIGS. 3C and 3D, the central portion 36 of the elastic material moves away from the vent opening 16 to unblock the vent opening 16. When the vent opening 16 is unblocked, inflation fluid in the interior 14 of the air bag 10 flows through the vent opening 16 to relieve the pressure in the interior 14 of the air bag 10.

Also, when the panel 20 is in an open position such as shown in FIGS. 3C and 3D, the central portion 36 of the elastic material of the panel 20 in part defines a passage 46 between the outer surface 40 of the air bag 10 and the central portion 36 of the elastic material of the panel 20. This passage 46 communicates the interior 14 of the air bag 10 with the passenger compartment of the vehicle. The panel 20 deflects the inflation fluid flow which passes through the vent opening 16 and directs the deflected inflation fluid flow in a direction which is generally perpendicular to the direction of inflation fluid flow through the vent opening 16. More specifically, the panel 20 directs the vented inflation fluid forwardly in the vehicle away from the occupant 13. The panel 20 also restricts flow of the vented inflation fluid rearwardly in the vehicle toward the occupant 13.

When the pressure in the interior 14 of the air bag 10 is reduced sufficiently, the panel 20 moves from an open position such as shown in FIGS. 3C and 3D back toward the closed position shown in FIGS. 3A and 3B because of the resilience of the elastic material of the panel 20. As the panel moves from an open position back to the closed position, the rightmost edge of the panel 20 (as viewed in FIGS. 3A and 3C) returns from stretched length L2 shown in FIGS. 3C and 3D back to the unstretched length L1 shown in FIGS. 3A and 3B. At the same time, the middle part of the panel 20 (as also viewed in FIGS. 3A and 3C) returns from stretched width W2 shown in FIG. 3C back to the unstretched width W1 shown in FIG. 3A.

A second embodiment of the present invention is illustrated in FIGS. 4A–4D. Since the embodiment of the invention illustrated in FIGS. 4A–4D is generally similar to the embodiment of the invention illustrated in FIGS. 3A–3D, similar numerals are utilized to designate similar components, the suffix letter "a" being associated with the numerals of the embodiment of FIGS. 4A–4D to avoid confusion.

As shown in FIGS. 4A and 4B, the elastic material of the panel 20a extends over the vent opening 16a in the air bag 10a. One end of the elastic panel 20a is fixedly secured to the outer surface 40a of the air bag 10a with stitches 100 made of a suitable thread. The opposite end of the panel 20a is also fixedly secured to the air bag 10a with stitches 102 which extend parallel to the stitches 100.

When the pressure in the interior 14a of the air bag 10a reaches a predetermined pressure, the panel 20a stretches from the closed position shown in FIGS. 4A and 4B to an open position such as shown in FIGS. 4C and 4D due to the increased pressure in the interior 14a of the air bag 10a. As the panel 20a moves from the closed position to an open position, the middle part of the central portion 36a of the elastic panel 20a (as viewed in FIGS. 4A and 4C) stretches from the unstretched length L1a shown in FIGS. 4A and 4B to a stretched length L2a shown in FIGS. 4C and 4D. The middle part of the central portion 36a of the panel 20a also has a stretched width W2a when the panel 20a is stretched such as shown in FIG. 4C. Stretched width W2a shown in FIG. 4C is narrower than the unstretched width W1a shown in FIG. 4A. When the panel 20a is in stretched condition shown in FIGS. 4C and 4D, inflation fluid is vented from the interior 14a of the air bag 10a through the vent opening 16a. The central portion 36a of the panel 20a deflects the inflation fluid flow which passes through the vent opening 16a and directs the deflected inflation fluid flow in opposite directions which are transverse to the direction of fluid flow through the vent opening 16a.

When the pressure in the air bag 10a is reduced sufficiently, the panel 20a moves from an open position shown in FIGS. 4C and 4D back toward the closed position shown in FIGS. 4A and 4B, and the middle part of the panel 20a (as viewed in FIGS. 4A and 4C) returns from stretched length L2a shown in FIGS. 4C and 4D back to the unstretched length L1a shown in FIGS. 4A and 4B. At the same time, the middle part of the panel 20a (also as viewed in FIGS. 4A and 4C) returns from stretched width W2a shown in FIG. 4C back to the unstretched width W1a shown in FIG. 4A.

A third embodiment of the present invention is illustrated in FIGS. 5A to 5D. Since the embodiment of the invention illustrated in FIGS. 5A to 5D is generally similar to the embodiment of the invention illustrated in FIGS. 3A to 3D, similar numerals are utilized to designate similar components, the suffix letter "b" being associated with the numerals of the embodiment of FIGS. 5A to 5D to avoid confusion.

As shown in FIGS. 5A and 5B, a panel 20b comprises a first panel portion 200 made of elastic material and a second panel portion 202 made of elastic material. The first and second panel portions 200, 202 are fixedly secured to the outer surface 40b of the air bag 10b with stitches 22b made of a suitable thread. The stitches 22b surround the vent opening 16b, as best shown in FIG. 5A. Part of the first panel portion 200 overlaps part of the second panel portion 202, as best shown in FIG. 5A.

When the pressure in the interior 14b of the air bag 10b reaches a predetermined pressure, the panel 20b moves from the closed position shown in FIGS. 5A and 5B to an open position such as shown in FIGS. 5C and 5D. More specifically, the first and second panel portions 200, 202 stretch from closed positions shown in FIGS. 5A and 5B to open positions such as shown in FIGS. 5C and 5D due to the pressure in the interior 14b of the air bag 10b. As the first and second panel portions 200, 202 stretch from the closed positions to open positions such as shown in FIGS. 5C and 5D, the elastic material of the first and second panel portions 200, 202 stretch relative to each other to form an eye-shaped opening 210, as best shown in FIG. 5C. The eye-shaped opening 210 overlies the vent opening 16b. Thus, when the eye-shaped opening 210 is formed, inflation fluid in the interior 14b of the air bag 10b flows through the vent opening 16b and the eye-shaped opening 210 to relieve the pressure in the interior 14b of the air bag 10b.

When the pressure in air bag 10b is reduced sufficiently, the panel 20b moves from open position such as shown in FIGS. 5C and 5D back toward the closed position shown in FIGS. 5A and 5B. Also, the first and second panel portions 200, 202 return from stretched positions such as shown in FIGS. 5C and 5D back to their unstretched positions shown in FIGS. 5A and 5B. As this occurs, the eye-shaped opening 210 which overlies the vent opening 16b closes.

A fourth embodiment of the present invention is illustrated in FIGS. 6A to 6B. Since the embodiment of the invention illustrated in FIGS. 6A to 6D is generally similar to the embodiment of the invention illustrated in FIGS. 5A to 5D, similar numerals are utilized to designate similar components, the suffix letter "c" being associated with the numerals of the embodiment of FIGS. 6A to 6D to avoid confusion.

As shown in FIGS. 6A and 6B, the panel 20c comprises a first panel portion 300 made of elastic material, a second panel portion 302 made of elastic material, and a third panel portion 304 made of elastic material. As best illustrated in FIGS. 6A and 6B, part of the second panel portion 302 overlies part of the first panel portion 300. Also, part of the first panel portion 300 overlies part of the third panel portion 304. Further, part of the third panel portion 304 overlies part of the second panel portion 302. The overlying panel portions 300, 302, 304 are fixedly secured to the outside surface 40c of the air bag 10c with stitches 22c made of a suitable thread. The stitches 22c extend around the entire perimeter of the vent opening 16c, as best shown in FIGS. 6A and 6C.

When the pressure in the interior 14c of the air bag 10c reaches a predetermined pressure, the panel 20c moves from the closed position shown in FIGS. 6A and 6B to an open position such as shown in FIGS. 6C and 6D. More specifically, the first, second, and third panel portions 300, 302, 304 stretch from closed positions shown in FIGS. 6A and 6B to open positions such as shown in FIGS. 6C and 6D due to the pressure in the interior 14c of the air bag 10c. As the first, second, and third panel portions 300, 302, 304 stretch from the closed positions to open positions such as shown in FIGS. 6C and 6D, the elastic material of the first, second, and third panel portions 300, 302, 304 stretch relative to each other to form an iris-like opening, as best shown in FIG. 6C. The iris-like opening 310 overlies the vent opening 16c. Thus, when the iris-like opening 310 is formed, inflation fluid in the interior 14c of the air bag 10c flows through the vent opening 16c and the iris-like opening 310 to relieve the pressure in the interior 14c of air bag 10c.

When the pressure in air bag 10c is reduced sufficiently, the panel 20c moves from open position such as shown in FIGS. 6C and 6D back toward the closed position shown in FIGS. 6A and 6B. Also, the three panel portions 300, 302, 304 return from stretched positions shown in FIGS. 6C and 6D back to their unstretched positions shown in FIGS. 6A and 6B. As this occurs, the iris-shaped opening 310 which overlies the vent opening 16c closes.

A fifth embodiment of the present invention is illustrated in FIGS. 7A to 7D. Since the embodiment of the invention illustrated in FIGS. 7A to 7D is generally similar to the embodiment of the invention illustrated in FIGS. 4A to 4D, similar numerals are utilized to designate similar components, the suffix letter "d" being associated with the numerals of the embodiment of FIGS. 7A to 7D to avoid confusion.

Figures 7A, 7B, 7C, 7D:
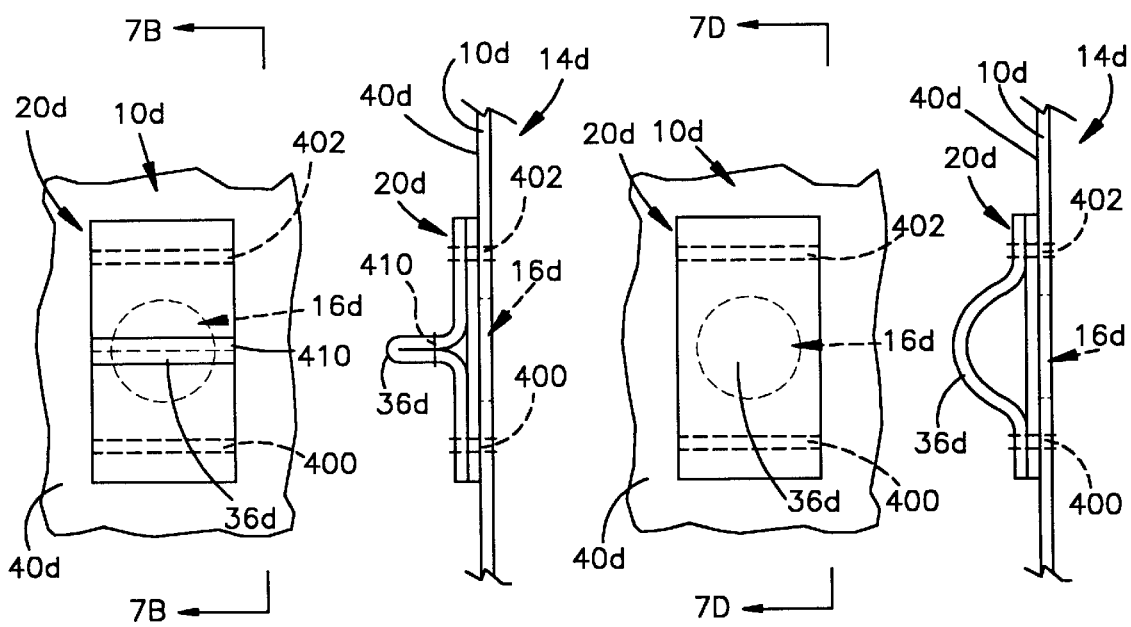
FIGS. 7A–7D are views similar to FIGS. 4A–4D and showing a fifth embodiment of the present invention.

One lengthwise end of the panel 20d is fixedly secured to the outside surface 40d of the air bag 10d with stitches 400 made of a suitable thread. Similarly, the opposite end of the panel 20d is fixedly secured to the outside surface 40d of the air bag 10d with stitches 402 made of a suitable thread. The stitches 400 and 402 extend parallel to each other. Also, the central portion 36d of the panel 20d has a fold which forms overlapping layers. The overlapping layers are stitched together in an overlapping relationship with stitches 410 made of a suitable thread, as best shown in FIG. 7B. In this embodiment, the material of the panel 20d may or may not be elastic.

When the pressure in the interior 14d of the air bag 10d reaches a predetermined pressure, the panel 20d moves from the closed position shown in FIGS. 7A and 7B to an open position such as shown in FIGS. 7C and 7D due to the increased pressure in the interior 14d of the air bag 10d and thereby causes the stitches 410 to break. As the panel 20d moves from the closed position to an open position such as shown in FIGS. 7C and 7D, the central portion 36d of the panel 20b moves away from the vent opening 16d to unblock the vent opening 16d. When the vent opening 16d is unblocked, inflation fluid in the interior 14d of the air bag 10d flows through the vent opening 16d to relieve the pressure in the interior 14d of the air bag 10d. The central portion 36d of the panel 20d deflects the inflation fluid flow which passes through the vent opening 16d and directs the deflected inflation fluid flow in a direction which is transverse to the direction of fluid flow through the vent opening 16d.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. An inflatable air bag for, when inflated, restraining a vehicle occupant, said air bag comprising:

air bag material having an outer surface and an inner surface, said inner surface defining a chamber into which inflation fluid is directed to inflate said air bag, said air bag material including a surface extending between said outer and inner surface and defining an opening for venting inflation fluid from said chamber;

a panel lying on said outer surface of said air bag material, said panel comprising at least a first single continuous piece of elastic material having a length and a width and completely overlying said opening in said air bag material;

said elastic material being stretchable in response to inflation fluid pressure in said chamber, said elastic material being stretchable from an unstretched first length in which a central portion of said elastic material completely blocks said opening to a stretched second length in which said central portion of said elastic material stretches and moves away from said opening to unblock said opening and thereby allows inflation fluid to be vented through said opening, said stretched second length being greater than said unstretched first length; and, means for fixedly securing said elastic material of said panel to said outer surface of said air bag material and for causing, during pressure relief, the panel elastic material to deform and whereby through this deformation, a width or length dimension and elastic material associated with the width or length dimension shorten and whereby through this shortening of the width or length dimension, the associated elastic material of the width or length dimension goes from completely covering the opening to a shortened length or width which at least partially uncovers the opening.

2. An inflatable air bag according to claim 1 wherein said means comprises stitches located only at opposite ends of said elastic material.

3. An inflatable air bag according to claim 2 wherein said central portion of said elastic material is located between said opposite ends of said elastic material, said central portion of said elastic material having a narrower width in said stretched second length than when in said unstretched first length.

4. An inflatable air bag for, when inflated, restraining a vehicle occupant, said air bag comprising:

air bag material having an outer surface and inner surface, said inner surface defining a chamber into which inflation fluid is directed to inflate said air bag, said air bag material including a surface extending between said outer and inner surfaces and defining an opening for venting inflation fluid from said chamber;

a panel lying on said outer surface of said air bag material, said panel comprising at least a first single continuous piece of elastic material having a length and a width and overlying at least a part of said opening in said air bag material;

said elastic material being stretchable in response to inflation fluid pressure in said chamber, said elastic material being stretchable from an unstretched first length in which a central portion of said elastic material blocks as least a part of said opening to a stretched second length in which said central portion of said elastic material stretches and moves away from said opening to unblock said opening and thereby allows inflation fluid to be vented through said opening, said stretched second length being greater than said unstretched first length; and, means for fixedly securing said elastic material of said panel to said outer surface of said air bag material, said means consisting of stitches extending in a generally U-shaped pattern around said opening in said air bag material and forming a shape with an open end whereby the stitches do not completely surround said opening in said air bag material.

5. An inflatable air bag for, when inflated, restraining a vehicle occupant, said air bag comprising:

air bag material having an outer surface and an inner surface, said inner surface defining a chamber into which inflation fluid is directed to inflate said air bag, said air bag material including a surface extending between said outer and inner surfaces and defining an opening for venting inflation fluid from said chamber;

a panel lying-on said outer surface of said air bag material, said panel comprising opposite end portions and a central portion located between said end portions, said central portion including a first section and a second section overlapping said first section;

first securing means for securing said panel to said outer surface of said air bag material, said first securing means including stitches located only at opposite ends of said panel; and second securing means for securing said first and second sections of said central portion of said panel together to enable said panel to block said opening, said second securing means comprising stitches which secure said first and second sections of said central portion of said panel together and which are breakable in response to inflation fluid pressure in said chamber to allow said central portion of said panel to move away from said opening to unblock said opening and thereby to allow inflation fluid to be vented through said opening.

6. An inflatable air bag for, when inflated, restraining a vehicle occupant, said air bag comprising:

air bag material having an outer surface and an inner surface, said inner surface defining a chamber into which inflation fluid is directed to inflate said air bag, said air bag material including a surface extending between said outer and inner surfaces and defining an opening for venting inflation fluid from said chamber;

a panel lying on said outer surface of said air bag material, said panel comprising at least a first single continuous piece of elastic material having a length and a width and overlying at least a part of said opening in said air bag material;

said elastic material being stretchable in response to inflation fluid pressure in said chamber, said elastic material being stretchable from an unstretched first length in which a central portion of said elastic material blocks at least a part of said opening to a stretched second length in which said central portion of said elastic material stretches and moves away from said opening to unblock said opening and thereby allows inflation fluid to be vented through said opening, said stretched second length being greater than said unstretched first length; and, means for fixedly securing said elastic material of said panel to said outer surface of said air bag material, said means comprising stitches surrounding at least a generally U-shaped portion of the perimeter around said opening in said air bag material, said panel further comprising a second single continuous piece of elastic material having a length and a width and overlying at least a part of said opening, said second single continuous piece of elastic material having at least a portion which overlaps with a portion of said first single continuous piece of elastic material, said second single continuous piece of elastic material being fixedly secured by stitches around at least a generally U-shaped portion of the perimeter of said opening in said air bag material.

7. An inflatable air bag accordingly to claim 6 wherein said panel further comprises a third single continuous piece of elastic material having a length and a width and overlying at least a part of said opening, said third single continuous piece of elastic material having at least a first portion which overlaps with a portion of said first single continuous piece of elastic material and a second portion which overlaps with a portion of said second single continuous piece of elastic material, said third single continuous piece of elastic material being fixedly secured by stitches around at least a generally U-shaped portion of the perimeter of said opening in said air bag material.

8. An inflatable air bag for, when inflated, restraining a vehicle occupant, said air bag comprising:

air bag material having an outer surface and an inner surface, said inner surface defining a chamber into which inflation fluid is directed to inflate said air bag, said air bag material including a surface extending between said outer and inner surfaces and defining an opening for venting inflation fluid from said chamber;

a panel lying on said outer surface of said air bag material, said panel comprising at least a first single continuous piece of elastic material having a length and a width and overlying at least a part of said opening in said air bag material;

said elastic material being stretchable in response to inflation fluid pressure in said chamber, said elastic material being stretchable from an unstretched first length in which a central portion of said elastic material blocks at least a part of said opening to a stretched second length in which said central portion of said elastic material stretches and moves away from said opening to unblock said opening and thereby allows inflation fluid to be vented through said opening, said stretched second length being greater than said unstretched first length;

means for fixedly securing said elastic material of said panel to said outer surface of said air bag material, said means comprising stitches surrounding at least a generally U-shaped portion of the perimeter around said opening in said air bag material; and stitches which secure together part of said central portion of said elastic material layered upon another part of said central portion of said elastic material.

* * * * *